Figure 1:
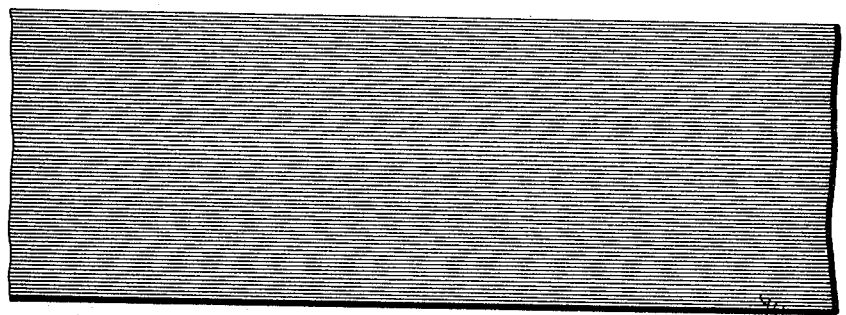

United States Patent
Candidus, Jr. et al.

[15] 3,652,165
[45] Mar. 28, 1972

[54] RELATIVE BACK FOCUS MONITORING METHOD AND APPARATUS

[72] Inventors: Edward S. Candidus, Jr., Boston; Thomas W. Snow, Melrose; John F. Ullathorne, Duxbury, all of Mass.

[73] Assignee: Polaroid Corporation, Cambridge, Mass.

[22] Filed: May 1, 1970

[21] Appl. No.: 33,660

[52] U.S. Cl. ..........................................356/125
[51] Int. Cl. ..........................................G01b 9/00
[58] Field of Search....................356/125; 250/204

[56] References Cited

UNITED STATES PATENTS 2,999,436  9/1961  Faulhaber..................................95/10

OTHER PUBLICATIONS

Potential App. for Focatron Idea, Dwin R. Craig, Nov., 1961,

*Primary Examiner*—Ronald L. Wibert
*Assistant Examiner*—Conrad Clark
*Attorney*—Brown and Mikulka, William D. Roberson and Michael Bard

[57] ABSTRACT

The subject invention provides an improved method and apparatus for determining the relative back-focus of each of a plurality of lenticules or the like and, more particularly, provides a method and a means for sequentially determining the relative back-focus of each of a plurality of lenticules, comprising a lenticular film which is disposed along one surface of a supporting web.

The relative back-focus of each lenticule or the like may be generally defined as the distance from the focus of said lenticule or the like to a reference which, in the case of a web supported lenticular film, is the surface of the web opposite the lenticular film. Briefly, collimated light is passed through each of the lenticules and is focused by a stationary microscopic objective which is positioned outward of the surface of the web opposite the lenticular film. A movable aperture plate is positioned outward of the microscopic objective and is moved toward and away from said microscopic objective so that the position of the image of the focused collimated light varies with respect to said aperture plate.

When the image of said lenticule is focused in the plane of said aperture plate, it is detected by a photo-detector which provides an electrical output pulse indicative thereof. Means are provided for determining the position of the aperture plate at the time of said pulse.

A source of light of a wavelength different from that of said collimated light is provided and transmits light through said microscopic objective to the non-lenticulated side of said web so as to be reflected therefrom. This reflected light is focused remote from said web by said microscopic objective and the aperture plate is moved with respect to the microscopic objective until said reflected light is focused in the plane of said aperture plate. When the reflected light is so focused, in the plane of the aperture plate, it is detected by a second photo-detector which will provide an electrical output pulse in response thereto.

The position of the microscopic objective is determined at the time of the electrical output pulse responsive to said reflected light, and the distance traversed by said aperture plate, between said output pulses, may be readily determined. For a given microscopic objective, the distance traversed by the aperture plate will be a multiple of the relative back-focus of the lenticule being monitored which is dependent on the focal length of the microscopic objective.

18 Claims, 6 Drawing Figures

RELATIVE BACK FOCUS MONITORING METHOD AND APPARATUS

BACKGROUND OF THE INVENTION

The present invention relates, generally, to optical measuring instruments and, more particularly, to means for determining the relative back-focus of a lenticule or the like.

In general, color screen elements comprise a screen pattern formed of a plurality of light-transmitting colored elements which are each of an independent primary color and which are generally classifiable into different groups in accordance with the color thereof. Thus, a conventional three color additive screen generally has a set or group of red colored filter elements, a set of blue colored filter elements and a set of green colored filter elements. These filter elements are ordinarily in a mosaic or geometrical pattern in a random or regular distribution.

In U.S. Pat. No. 3,284,208, issued on Nov. 8, 1966 to Edwin H. Land, it was shown that photographic multi-colored screen elements exhibiting a high degree of optical acuity and particularly adapted for use in additive multi-color photographic processes, both conventional and diffusion transfer types, may be expeditiously prepared, in general, by successively coating (on the smooth flat surface of a lenticular film) a plurality of photoresponsive layers. Each photoresponsive layer is subjected to exposure radiation incident on the lenticular film at angles adapted to provide exposed areas of the coating contiguous each lenticule. The unexposed areas of the coating are then removed and the exposed areas dyed to provide a series of chromatic filter elements. The incident radiation employed to effect exposure of successive photoresponsive layers is directed so as to provide formation of each series of chromatic filter elements in substantial side-by-side relationship on the smooth surface of the lenticular film.

It is readily apparent that in the manufacture of such photographic multi-color screen elements the optical properties of the lenticules comprising the lenticular layer and, more particularly, the uniformity of such properties between lenticules becomes extremely important.

One such property which must be maintained uniform between lenticules is the relative back-focus of each of said lenticules. If we consider a lenticular film as comprising a support, or web, having a lenticular layer on one surface thereof, we may define the term relative back-focus to mean the distance from the focus of a lenticule to the surface of said support or web remote from said lenticular layer. Any significant variation in the relative back-focus between each of the lenticules comprising the lenticular layer will adversely affect the formation of a suitable series of chromatic filter elements aforesaid.

SUMMARY OF THE INVENTION

The instant invention provides a means for sequentially determining the relative back-focus of each of the lenticules in a web-supported lenticular film. The invention accomplishes its purpose by employing a source which transmits collimated light through a green filter and thence through at least a preselected one of said lenticules from whence it is transmitted through a microscopic objective which focuses the collimated light through a first beam splitter to a point remote from said microscopic objective.

An aperture plate is positioned remote from said microscopic objective, symmetrically disposed about the optical axis thereof, and is movable with respect thereto so as to be able to move toward and away therefrom. At some point in the movement of the aperture plate, the green-filtered light will be focused in the plane thereof. When the green-filtered light is so focused in the plane of the aperture plate, it will be transmitted through a second beam splitter to a first photo-detector in an amount sufficient to cause said first photo-detector to emit an electrical output pulse.

A source of non-collimated light is provided which transmits light through a blue filter onto said first beam splitter from whence it is reflected through said microscopic objective onto the surface of said web remote from said lenticular layer. The blue-filtered light reaching said remote web surface is reflected therefrom back through said microscopic objective which focuses said blue-filtered light through said first beam splitter to a position remote from said microscopic objective.

The blue-filtered light focused by said microscopic objective through said fist beam splitter will be reflected by said second beam splitter through a blue filter to a second photo-detector. At some point in the traverse of said aperture plate, the blue-filtered light will be focused in the plane thereof and be reflected by said second beam splitter through said blue filter to said second photo-detector with sufficient intensity to cause said second photo-detector to emit an electrical output signal. Means are provided for determining the position of the aperture plate at the time of the emission of said electrical output pulse from said second photo-detector and for comparing the positions of said aperture plate at the times of emission of the electrical output pulses from said first and second photo-detectors, respectively.

The comparing means serves to provide an output signal corresponding to the distance between the focused images of the blue light and the green light, or more simply, to a function of the relative back-focus of the particular lenticule being monitored. The distance between said images will be a fixed multiple of the relative back-focus of the lenticule under observation, the magnitude of which is dependent on the linear longitudinal magnification of the microscopic objective, and hence, said relative back-focus will be readily determined.

The subject invention is equally adapted for determining the distance from the focus of any lens within or without a lens structure (such as a mosaic arrangement of lenses supported by a web) to a reference.

Accordingly, it is an object of the present invention to provide a means of assuring a high degree of optical acuity in photographic multi-color screen elements.

A further object of this invention is to provide a means for assuring uniformity between the lenticules comprising a lenticular film.

A still further object of the instant invention is to provide a means for determining the relative back-focus of each of a plurality of lenticules or the like.

Another object of this invention resides in the provision of means for optically detecting the focus of each of the lenticules or the like comprised in a web-supported film, simultaneously optically detecting the surface of said web remote from said film, and determining the distance between said focus and said remote surface to effect an indication of the relative back-focus of each of said lenticules or the like.

Yet another object of the instant invention is to provide a means of assuring uniformity between the lenticules of a movable web-supported lenticular film by optically scanning such lenticules in a direction transverse to the direction of movement of said film.

Figure 2:
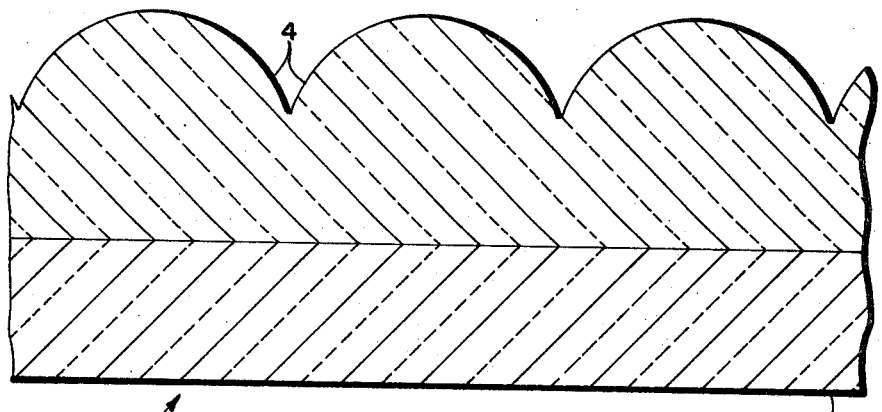
Figure 3:
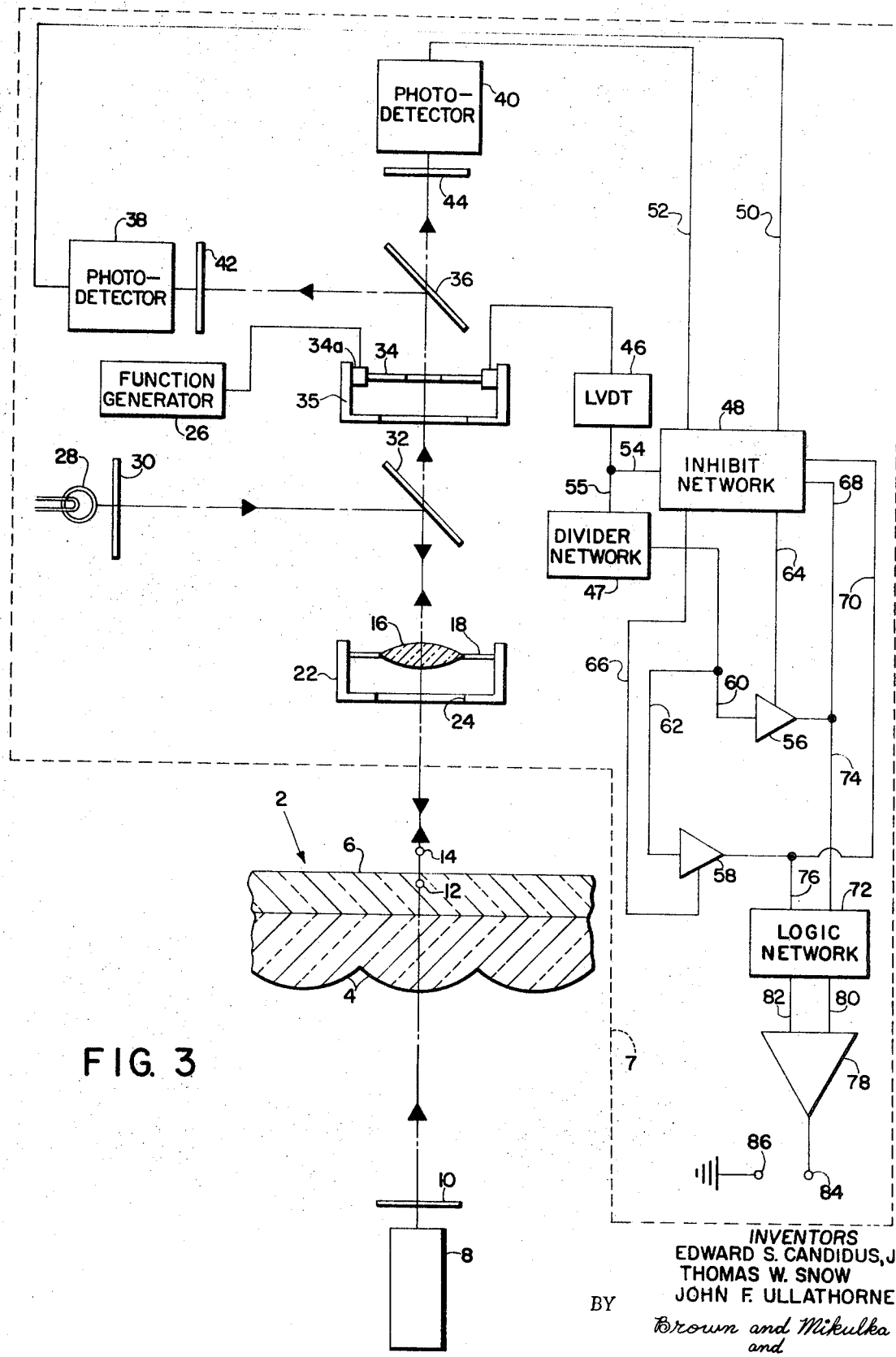
Figure 4:
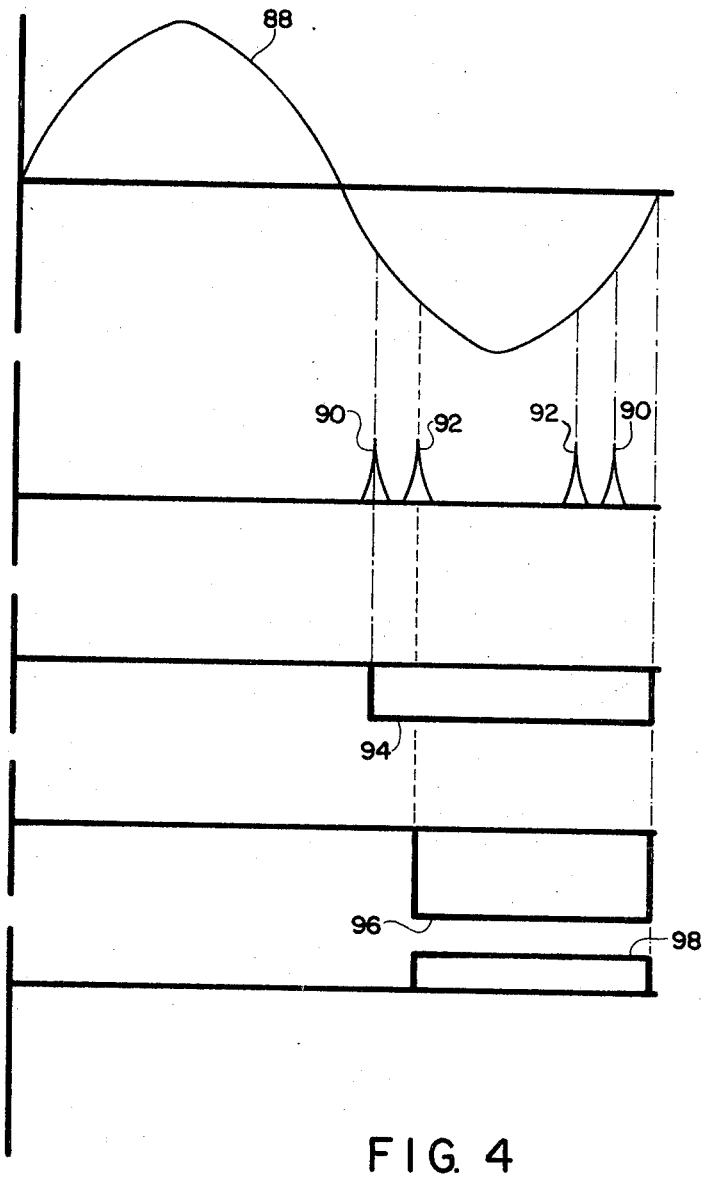
Figure 5:
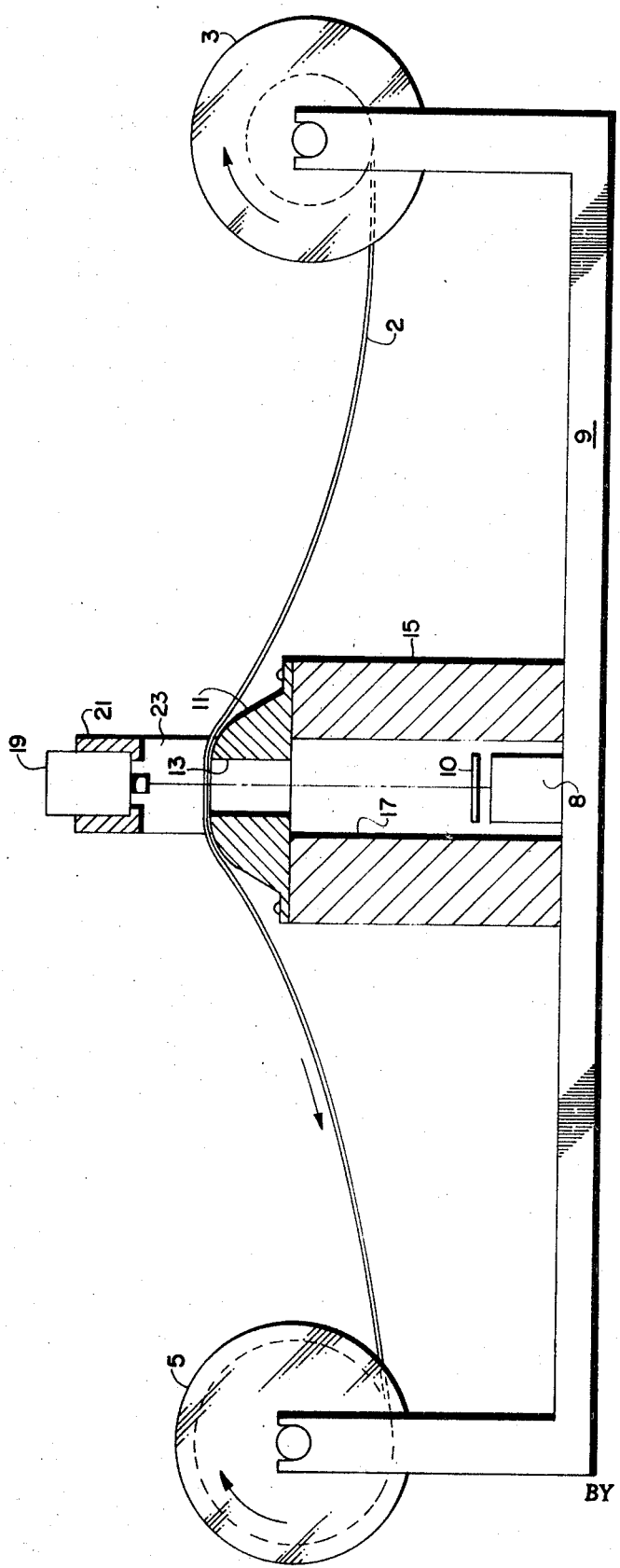
Figure 6:
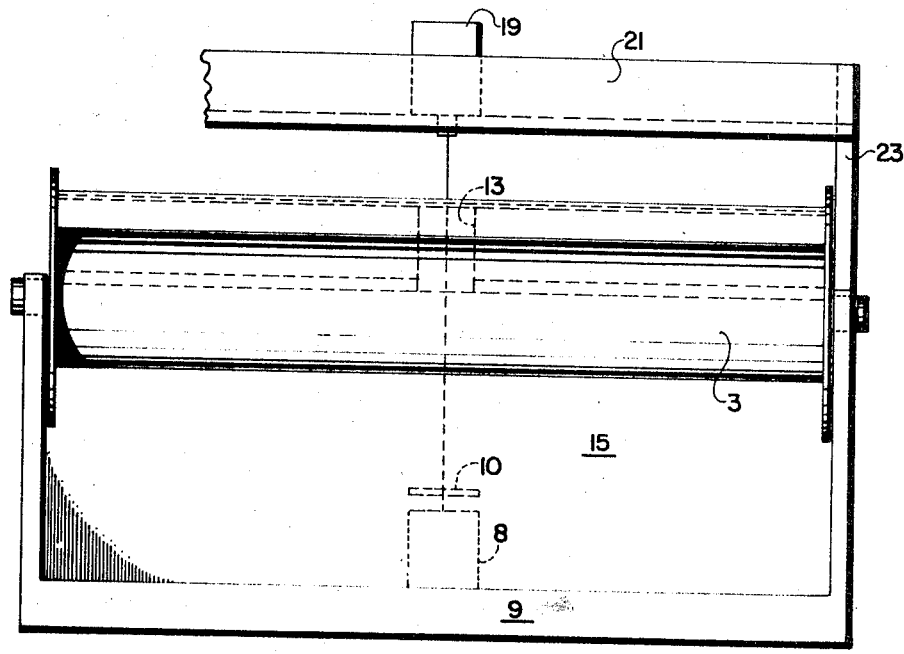

Other objects and many of the attendant advantages of the present invention will be better appreciated and said invention will be clearly understood with reference to the following detailed description when considered in conjunction with the accompanying drawings illustrating one embodiment of the instant invention, wherein:

FIG. 1 provides a top plan of a portion of the lenticular film of the present invention;

FIG. 2 provides an enlarged fragmentary cross-section of lenticular film of FIG. 1;

FIG. 3 provides a simplified diagrammatic representation of a portion of the subject invention;

FIG. 4 provides a graphical illustration of the various electrical signals generated by the apparatus of FIG. 3;

FIG 5 provides a simplified front elevation of the subject invention, partly in section; and FIG. 6 provides a simplified fragmentary side elevation of the subject invention.

Referring to the drawings in more detail, and more particularly to FIG. 1, a piece of lenticular film is shown generally at 2, including a plurality of longitudinally extending lenticules 4 spaced transversely thereacross. Typically, the film 2 may contain 750 lenticules 4 per inch of width.

Referring to FIGS. 5 and 6 in more detail, the film 2 is shown mounted on a pair of spaced rollers 3 and 5, respectively, for advancement longitudinally therebetween in the direction of the arrows. The rollers 3 and 5 are rotatably supported by a frame 9 and either or both may be driven in a well-known manner (not shown).

The film 2 is supported in its span by means of an air bearing 11 having an opening 13 centrally therethrough. The air bearing 11 is secured to the frame 9 by a support 15 having an opening 17 centrally therethrough. With the film 2 thus positioned, and moving between the rollers 3 and 5, it is desired to detect the relative back-focus of the lenticules 4 thereof to assure uniformity therebetween.

Referring again to FIG. 2, the film 2 is seen to comprise a web 6 which provides a supporting base for the lenticules 4, with said web 6 and said lenticules 4 being light transmissive. Referring again to FIG. 3, the relative back-focus monitor comprising the present invention is shown generally at 7 together with a source of collimated light 8 disposed outward of the lenticulated side of a portion of the lenticular film 2, and transmitting collimated light through a green filter 10 so as to illuminate at least a preselected one of the lenticules 4 of the film 2 with green collimated light.

As best seen in FIG. 5, the collimated light source 8 and the green filter 10 are positioned on the frame 9 within the opening 17 in the support 15 whereby light from said source 8 will be able to reach the lenticulated surface of the film 2 through the opening 13 in the air bearing 11.

The relative back-focus monitor 7 is mounted within a carriage 19 in a well-known manner and the carriage 19 is movably mounted outward of the non-lenticulated surface of the film 2 on a cross-slide 21. The cross-slide 21 is itself mounted on a vertical support 23 which in turn is secured to the frame 9. The cross-slide 21 extends transversely of the film 2 in spaced relation thereto such that the carriage 19, together with the relative back-focus monitor 7, may slide transversely of the film 2 while maintaining a predetermined spacing with respect to the non-lenticulated surface of said film 2.

In practice, the carriage 19 and the relative back-focus monitor 7 are driven back and forth transversely of the film 2 as by a motor (not shown) so as to sequentially pass each of the lenticules 4 illuminated by the source 8 through the filter 10.

Depending on its optical properties, the illuminated lenticule 4 will focus the green collimated light to a position within or without the film 2 such as shown at 12 and 14, respectively. If the green collimated light is focused within the film 2 to a position such as the position 12, the lenticule 4 may be arbitrarily designated as exhibiting a negative relative back-focus. Conversely, where the green collimated light is focused at the position 14, without the film 2, the lenticule 4 may be arbitrarily designated as exhibiting a positive relative back-focus.

A microscopic objective 16 is disposed, within the carriage 19, outward of the non-lenticulated side of the web 6 with its optical axis in alignment with that of the collimated light source 8. The microscopic objective 16 is secured, by a lens holder 18, to a housing 22, having an aperture 24 enabling the objective to see the focused image of the collimated source 8. The objective 16 is fixed within the carriage 19 and, hence, maintains a fixed spacing with respect to the non-lenticulated surface of the film 2.

A non-collimated light source 28, such as an incandescent lamp, transmits light through a blue filter 30 to a beam splitter 32 which is positioned outward of the objective 16 and in alignment with the optical axis thereof. A portion of blue-filtered light transmitted to the beam splitter 32 is reflected therefrom and transmitted through the microscopic objective 16 and the aperture 24 onto the non-lenticulated surface of the web 6.

An aperture plate 34 is secured to a magnet and coil assembly 34a which, in turn, is secured to a housing 35. A function generator 26, such as a common sine wave generator, is connected to the magnet and coil assembly 34a, so as to supply a sinusoidal driving signal thereto and effect the sinusoidal movement of the aperture plate 34 toward and away from the microscopic objective 16.

The aperture plate 34 is disposed outward of the beam splitter 32 and in alignment with the optical axis of the objective 16 and the collimated light source 8, and a second beam splitter 36 is positioned outward of the aperture plate 34 whereby light transmitted through the beam splitter 32 and the aperture plate 34 will impinge on the beam splitter 36.

A pair of photo-detectors 38 and 40, having blue and green filters, 42 and 44, respectively, are disposed with respect to the beam splitter 36 whereby the photo-detector 38 will receive any blue light reflected by the beam splitter 36 and the photo-detector 40 will receive any green light transmitted by the beam splitter 36.

A linear voltage distance transducer 46, or LVDT, (as it will be called hereinafter), is connected to the magnet and coil assembly 34a and provides an electrical output signal whose amplitude is a linear function of the displacement of the aperture plate 34 from its initial neutral, or at rest, position.

An inhibit network 48, the configuration of which is within the purview of ordinary skill in the art, is connected to the photo-detectors 38 and 40 via signal paths 50 and 52, respectively, and to the output of the LVDT 46 via a signal path 54.

The output of the LVDT 46 is also coupled to the input of a divider network 47, via a signal path 55, the output of which is coupled to the input of each of a pair of sample and hold networks 56 and 58 via a pair of signal paths 60 and 62, respectively. The sample and hold networks 56 and 58 are also coupled to the inhibit network 48 so as to receive input signals therefrom via a pair of signal paths 64 and 66, respectively. The outputs of the sample and hold networks 56 and 58 are coupled to the inhibit network 48 via a pair of signal paths 68 and 70, respectively, for clearing the sample and hold networks 56 and 58 at the appropriate time and in a well-known manner.

The outputs of the sample and hold networks 56 and 58 are also coupled to a logic network 72 via a pair of signal paths 74 and 76, respectively. The details of the logic network 72 will not be dealt with herein, however, said logic network 72 is of a type commonly employed in the art and serves to pass only those portions of the output signals from the sample and hold networks 56 and 58 as occur simultaneously. The logic network 72 is coupled to a difference amplifier 78, via a pair of signal paths 80 and 82, which serves to provide an output signal across a pair of terminals 84 and 86, indicative of the output signal from the sample and hold network 58 less the output signal from the sample and hold network 56.

Before proceeding further, it should be noted that the directions of the various principal light rays appearing at different points in the relative back-focus monitor 7 (FIG. 3) are indicated thereon by arrowheads. Also, as mentioned hereinabove, the relative back-focus monitor 7 sequentially scans each of the lenticules 4 by moving transversely of the lenticular film 2 by means of the sliding carriage 19 (FIGS. 5 and 6).

Accordingly, where it is desired to monitor the relative back-focus of each of the lenticules 4, while the relative back-focus monitor 7 is transversely traversing the lenticular film 2, it is necessary to provide a driving signal to the magnet and coil assembly 34a (and hence to the aperture plate 34) of sufficient frequency so that said aperture plate 34 completes at least one cycle of movement for each lenticule it passes. For this purpose, it has been found most expedient to drive the aperture plate 34 sinusoidally and hence the function generator 26 provides a sine wave signal 88 (FIG. 4) to the magnet and coil assembly 34a.

Considering the operation of the relative back-focus monitor 7 in more detail and referring again to FIG. 3, green collimated light from the source 8 and the filter 10 is transmitted to the lenticule 4 being monitored which will bring the green collimated light to a focus such as 12 or 14, depending on the optical properties of the particular lenticule 4 being monitored. At the same time, non-collimated blue light, from the lamp 28 and the blue filter 30, will be transmitted to the beam splitter 32 and a portion thereof will be reflected thereby through the microscopic objective 16 and the aperture 24 to the non-lenticulated surface of the web 6 from whence it will be reflected.

Assume now that the relative back-focus of the particular lenticule 4 being monitored is positive. Also, it should be noted that the relative back-focus of the lenticules 4 comprising the lenticular film 2 will vary within known prescribed limits. Consider further, that the microscopic objective 16 is positioned outward of the non-lenticulated surface of the web 6, a distance sufficient such that the first principal focus of the objective 16 is outward of both the non-lenticulated surface of the web 6 and the most positive focus, such as 14, of any of the lenticules 4.

The microscopic objective 16 will see the image of the focused green light as well as the image of the blue light reflected from the non-lenticulated surface of the web 6. When the aperture plate 34 is in its initial or neutral position, the microscopic objective 16 will focus the images of the blue light and the green light through the beam splitter 32 short of the aperture plate 34.

The beam splitter 32, of course, will only transmit a portion of the green and the blue light focused by the microscopic objective 16. Also, since the images of the blue light and the green light are focused short of the aperture plate 34, only a small portion of said blue and said green light will be transmitted to the beam splitter 36. Said beam splitter 36 will reflect a portion of the light reaching it through the filter 42 to the photo-detector 38 and transmit a portion thereof through the filter 44 to the photo-detector 40.

Upon application of the sinusoidal driving signal 88 (and assuming it is increasing in a positive sense), to the magnet and coil assembly 34a, the aperture plate 34 will move further away from the microscopic objective 16 causing the images of the blue light and the green light to be focused by said objective 16 still further short of the aperture plate 34, with a resultant decrease in the light reaching the photo-detectors 38 and 40.

At the start of the second half cycle of the signal 88 (i.e., when it begins increasing in a negative sense), the aperture plate 34 will begin to move closer (than its initial position) to the microscopic objective 16 causing the images of the blue light and the green light to approach the aperture plate 34 with an attendant increase in the illumination reaching the photo-detectors 38 and 40.

The aperture plate 34 is such that it will pass the maximum amount of blue light when the image of said blue light is focused in the plane of said aperture plate 34. When this occurs, the blue light transmitted by the aperture plate 34 to the beam splitter 36 and reflected therefrom, through the blue filter 42, to the photo-detector 38, will be sufficient to cause the photo-detector 38 to emit an output pulse. In a like manner, when the image of the green light is focused in the plane of the aperture plate 34, the maximum amount of green light will be transmitted through the beam splitter 36, and the green filter 44, to the photo-detector 40 which will emit an output pulse in response thereto. The filters 42 and 44 serve to prevent their respective photo-detectors 38 and 40 from responding to the green and blue illumination, respectively.

With the relative back-focus, of the lenticule 4 being monitored, positive, the image of the focused green light will appear in the plane of the aperture plate 34 prior to that of the reflected blue light so that a pulse 90 (FIG. 4) will appear at the output of the photo-detector 40 prior to the appearance of a like pulse 92 (FIG. 4) at the output of the photo-detector 38.

Of course, where the relative back-focus, of the lenticule 4 being monitored, is negative, the pulse order will be reversed.

As mentioned hereinabove, the photo-detectors 38 and 40 are connected to an inhibit network 48 via the signal paths 50 and 52, respectively. The inhibit network 48 is connected to the LVDT 46, via the signal path 54, and continually receives signals therefrom (in phase with the signal 88) indicative of the instantaneous position of the sinusoidally moving aperture plate 34.

The inhibit network 48 functions to pass the signals 90 and 92 received from the photo-detectors 40 and 38, respectively, which occur during a predetermined quarter of the cycle of the driving signal 88 (FIG. 4). Thus, while in the example illustrated the output pulses 90 and 92 will occur twice during one-half cycle of the sine wave signal 88 (because the aperture plate 34 will be in the same relative position to the microscopic objective 16 twice during this period) only the first occurring pulses 90 and 92 will be transmitted through the inhibit network 48 to the sample and hold networks 58 and 56, respectively.

Upon receipt of the pulse 90, the sample hold network 58 will detect the output signal from the divider network 47 (which will be that of the LVDT 46 divided by a constant depending on the linear longitudinal magnification of the objective 16) and provide a DC level output signal 94 (FIG. 4) corresponding in amplitude thereto. In a like manner, upon receipt of the pulse 92, the sample and hold network 56 will sample the output from the divider network 47, transmitted over the signal path 60, and provide a DC level output signal 96 (FIG. 4) corresponding in amplitude thereto. The networks 56 and 58 will hold the DC output levels 96 and 94, respectively, until they are cleared by the inhibit network 48 (via the signal paths 68 and 70, respectively). The inhibit network 48 functions to clear the sample and hold networks 56 and 58 at the end of every cycle of the sine wave signal 88 in a well-known manner.

The DC level output signals 94 and 96 are coupled to the logic network 72 via the signal paths 76 and 74, respectively. The logic network 72 functions to delay the earlier occurring of the signals 94 or 96 (which in the case illustrated, will be the signal 94) until the occurrence of the other of the signals 94 or 96. Thus, the two DC levels 94 and 96 will be simultaneously fed to the difference amplifier 78 which will always subtract the DC level 96 from the DC level 94 to yield a DC level output signal 98 (FIG. 4) across the terminals 84 and 86.

As best seen in FIG. 4, for the case of a positive relative back-focus (and considering movement of the aperture plate 34 toward the microscopic objective 16 to be negative), the focus 14 will be detected before the non-lenticulated surface of the web 6 and, hence, the pulse 90 will precede the pulse 92. Consequently, the level of the signal 94 will be less negative than that of the signal 96, resulting in a positive signal 98 equal in magnitude to the difference between the signals 94 and 96 and, hence, equal to the relative back-focus of the particular lenticule being monitored. In the case of a negative relative back-focus, the order of occurrence of the pulses 90 and 92, and 94 and 96 (as well as the sign of the output signal 98) will be reversed.

In the case where the relative back-focus of the particular lenticule 4 being monitored is negative, a minor inaccuracy comes into play. In such a situation, the focus of the lenticule 4 being monitored will lie inside the web 6 such as at 12 (FIG. 3). Such a focus 12 will appear to the microscopic objective 16 as being closer than it actually is due to the change in the index of refraction in passing from the film 2 to the air beyond. Hence, the images of the blue and the green light will be focused in the plane of the aperture plate 34 when said aperture plate 34 is closer to its initial or at rest position than it would be expected to be. While in many applications the error introduced by this change in the index of refraction may be so small as to be tolerable, situations may arise wherein such will not be the case. In such an event, however, a suitable correction can be made by multiplying the output signal 94 from the sample and hold network 58 by a constant.

It can readily be seen that many variations and modifications of the present invention are possible in the light of the aforementioned teachings, and it will be apparent to those skilled in the art that various changes in form and arrangement of components may be made to suit requirements without departing from the spirited scope of the invention. It is therefore to be understood that within the scope of the appended claims, the instant invention may be practised in a manner otherwise than is specifically described herein.

What is claimed is:

1. Apparatus for monitoring a plurality of serially arranged lenticulations, including:
    a source of light for illuminating each of said lenticulations and being focused thereby;
    lens means having an optical axis for monitoring such serially arranged lenticulations and sequentially imaging the focus of said light by each along said optical axis;
    movable aperture plate means or the like disposed in cyclically variable spaced relation along said optical axis with respect to a reference and to said lens means and sequentially passing through each said image during the monitoring of said lenticulations by said lens means;
    photoresponsive means for detecting the imaged foci of said light by said lenticulations and for generating a signal in response thereto; and
    means responsive to said signal for determining the distance between each of the foci of said lenticulations and said reference.

2. A method for determining the distance between the focus of a lenticule or the like and a predetermined reference, including the steps of:
    illuminating said lenticule or the like with light whereby an image will be focused by said lenticule or the like;
    bringing said image to a first focus along an axis;
    illuminating said reference and reflecting light therefrom;
    bringing said reflected light to a second focus along said axis;
    detecting said first and second foci; and
    measuring the distance between said first and second foci to thereby determine the distance between the focus of said lenticule or the like and said reference.

3. The method of claim 2, wherein said lenticule or the like is illuminated with light of one wavelength and light of a different wavelength is reflected from said reference.

4. The invention of claim 3 additionally including the steps of:
    moving an aperture plate toward and away from said lenticule or the like and said reference along the optical axis of said lenticule or the like so as to transmit the maximum amount of light of said one wavelength when said aperture plate is at said first focus and the maximum amount of light of said different wavelength when said aperture plate is at said second focus;
    measuring the position of said aperture plate when the light of said one wavelength transmitted is at a maximum and again when the light of said different wavelength is at a maximum; and
    comparing the positions of the aperture plates so measured to determine the distance between said reference and the focus of said lenticule or the like.

5. Apparatus for determining the distance from the focus of a lenticule or the like to a reference, including:
    means for illuminating said lenticule or the like so as to focus an image;
    lens means secured in spaced relation to said reference and said lenticule or the like for bringing said image to a first focus along an axis;
    means for illuminating said reference and reflecting light therefrom through said lens means to a second focus along said axis;
    means movably positioned in spaced relation to said lens means and along the optical axis thereof for passing a variable amount of light transmitted thereto by said lens means; said amount being a maximum with respect to said reflected light when said light transmitting means is at one of said foci and a maximum with respect to the light from said image when said light transmitting means is at the other of said foci;
    means for determining the position of said light transmitting means when said amount is a maximum with respect to said reflected light and again when said amount is a maximum with respect to light from said image; and
    means for comparing the positions of said transmitting means so determined to effect an indication of the distance between said reference and the focus of said lenticule or the like.

6. The invention as recited in claim 5 wherein the light illuminating said lenticule is of one wavelength and the light reflected from said reference is of a different wavelength.

7. The invention as related in claim 6, wherein said means for determining the position of said light transmitting means includes a pair of photo-detectors each responsive to light of a different one of said wavelengths and a beam splitter positioned spaced along said optical axis from said transmitting means for reflecting a portion of the light passing through said transmitting means to one of said photo-detectors and transmitting a portion of the light passing through said transmitting means to the other of the photo-detectors.

8. The invention as set forth in claim 7, wherein said position determining means includes transducer means connected to said transmitting means for monitoring the position thereof and providing an output signal in response thereto.

9. The invention as set out in claim 8, wherein said position determining means includes means connected to said transducer means for dividing the output thereof by a predetermined constant and means connected to said pair of photo-detectors, said transducer means and said dividing means for sampling the output from said dividing means in response to signals from each of said pair of photo-detectors and comparing said samples to effect an output signal indicative of the distance between the focus of said lenticule or the like and said reference.

10. The invention as described in claim 9, further including means for moving said transmitting means along said optical axis toward and away from said lenticule or the like and said reference and means for providing cyclical driving signals to said moving means.

11. The invention as set out in claim 10, wherein said means for illuminating said lenticule or the like comprises a source of chromatically filtered collimated light and said means for illuminating said reference comprises a source of chromatically filtered non-collimated light.

12. In apparatus for determining the relative back-focus of each of the lenticules or the like comprising a web supported film, the combination including:
    means for illuminating a preselected one of said lenticules or the like with collimated light of one wavelength whereby said lenticule or the like will focus the image of said collimated light;
    a lens positioned in fixed spaced relation to said web and along the optical axis of said lenticule or the like;
    a first beam splitter positioned spaced from said lens along the optical axis thereof;
    a source of non-collimated light, of a wavelength different from that of said source of collimated light, positioned with respect to said first beam splitter such that a portion of said non-collimated light will be reflected from said first beam splitter through said lens onto said web and be reflected from a surface thereof back through said lens and said first beam splitter;
    an aperture plate positioned along said optical axis in spaced relation to said lens and said first beam splitter and movable along said optical axis with respect to said lens so as to pass a variable amount of light transmitted through said first beam splitter;
    a second beam splitter positioned along said optical axis for transmitting a portion of the light passing through said aperture plate and reflecting a portion thereof;

means for detecting the light reflected by said second beam splitter;

means for detecting the light transmitted by said second beam splitter; and means connected to said aperture plate and to said detecting means for determining the position of said aperture plate in response to the energization of said detectors so as to provide an output signal indicative of the distance between the focus of said lenticule or the like and the reflecting surface of said web.

13. The invention as recited in claim 12, further including means for sinusoidally driving said aperture plate toward and away from said lens along said optical axis.

14. The invention as set forth in claim 13, further including means for dividing the change in position of said aperture plate so determined by a constant equal to the linear longitudinal magnification of said lens.

15. In apparatus for monitoring lenticules or the like of a type comprising a source of light for illuminating at least a preselected one of said lenticules or the like and being focused thereby, means for detecting the focus of said light, and means for comparing said focus with a reference and determining the distance therebetween, the improvement wherein said means for detecting the focus of said light includes:

a lens secured in fixed spaced relation to said reference; and means movably positioned along the optical axis of said lens, in spaced relation thereto, for transmitting a variable amount of light from said lens;

said light transmitted being a maximum when said transmitting means is spaced from said lens an amount proportional to the distance from said lens to said focus.

16. The invention as recited in claim 15, wherein said transmitting means comprises an aperture plate or the like.

17. Apparatus for monitoring a plurality of lenticules or the like, including:

a source of light for illuminating each of said lenticules or the like and being focused thereby;

means for sequentially scanning said plurality of lenticules or the like and detecting the focus of light by each, including lens means positioned along an axis in fixed spaced relation with respect to a reference;

aperture plate means or the like disposed in cyclically variable spaced relation along said axis with respect to said reference; and means for comparing the relative positions of said aperture plate means or the like and said reference and determining the distance therebetween in response to each sequentially detected focus to thereby determine the distance between each said focus and said reference.

18. Apparatus for monitoring a plurality of focusing means, including:

a source of light for illuminating each of said focusing means and being focused thereby;

lens means having an optical axis and positioned in fixed spaced relation along said axis with respect to a reference for sequentially scanning said plurality of focusing means and sequentially imaging the focus of said light by each to a position along said axis;

aperture plate means or the like disposed in cyclically variable spaced relation along said axis with respect to said lens means and sequentially passing through each said image at least once during the cyclical movement thereof;

first photoelectric means for detecting coincidence of each said image and said aperture plate means or the like;

means for illuminating said reference and imaging same at a position within the path of said aperture plate means or the like so as to be traversed by said aperture plate means or the like during the cyclical movement of said aperture plate means or the like;

second photoelectric means for detecting coincidence between the image of said reference and said aperture plate means or the like; and means for comparing the relative positions of said aperture plate means or the like and said reference and determining the distance therebetween in response to signals from said first and second photoelectric means, respectively, to thereby determine the distance between the focus of said light by each of said focusing means and said reference.

* * * * *